(12) United States Patent
Katakam et al.

(10) Patent No.: US 11,791,715 B2
(45) Date of Patent: Oct. 17, 2023

(54) INTELLIGENT ARCHITECTURE FOR ACTUATOR MOTOR DRIVE POWERED FROM WIDE-INPUT HIGH-VOLTAGE DIRECT CURRENT

(71) Applicant: Hamilton Sundstrand Corporation, Charlotte, NC (US)

(72) Inventors: Sridhar Katakam, Bangalore (IN); Somasekhar Valleru, Bangalore (IN); Nageswara Rao Kalluri, Karnataka (IN); Ashish Vijay, Rajasthan (IN)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 161 days.

(21) Appl. No.: 17/178,953

(22) Filed: Feb. 18, 2021

(65) Prior Publication Data

US 2021/0328518 A1 Oct. 21, 2021

(30) Foreign Application Priority Data

Apr. 16, 2020 (IN) .............................. 202011016495

(51) Int. Cl.
*H02M 1/36* (2007.01)
*H02M 3/156* (2006.01)

(52) U.S. Cl.
CPC ............. *H02M 1/36* (2013.01); *H02M 3/156* (2013.01)

(58) Field of Classification Search
CPC .......... H02M 1/36; H02M 3/10; H02M 3/145; H02M 3/155–1588; G05F 1/468; G05F 1/565

See application file for complete search history.

(56) References Cited

U.S. PATENT DOCUMENTS

| 4,525,674 A * | 6/1985 | Kammiller ............ H02M 3/156 |
| | | 327/143 |
| 5,602,724 A | 11/1997 | Balakrishnan |
| 6,801,419 B2 * | 10/2004 | Fukui ...................... G05F 1/573 |
| | | 361/93.1 |
| 7,977,816 B2 * | 7/2011 | Wei ................... H02J 7/007182 |
| | | 307/31 |
| 8,355,265 B2 | 1/2013 | Gengenbach |
| 10,135,340 B1 * | 11/2018 | Megaw ............... H02M 3/1582 |
| 10,141,855 B2 | 11/2018 | Fogel |
| 10,158,291 B1 | 12/2018 | Cinagrossi et al. |
| 10,496,122 B1 * | 12/2019 | Gottapu ................... G05F 3/30 |
| 2006/0022648 A1 | 2/2006 | Ben-Yaakov |
| 2012/0049819 A1 | 3/2012 | Mao et al. |

(Continued)

OTHER PUBLICATIONS

Kaplan, S.M., entry for "soft start," in Wiley Electrical and Electronics Engineering Dictionary, p. 772, Hoboken, NJ: Wiley & Sons Inc, 2004. (Year: 2004).*

(Continued)

*Primary Examiner* — Fred E Finch, III
(74) *Attorney, Agent, or Firm* — CANTOR COLBURN LLP

(57) ABSTRACT

An intelligent architecture system is provided. The intelligent architecture system includes an input line, an output line and an intelligent architecture operably interposed between the input line and the output line. The intelligent architecture is configured to control a voltage of the output line in accordance with a voltage of the input line.

7 Claims, 4 Drawing Sheets

(56) References Cited

U.S. PATENT DOCUMENTS

| | | | |
|---|---|---|---|
| 2012/0091978 A1* | 4/2012 | Ishii | H02M 1/36 323/271 |
| 2013/0163287 A1* | 6/2013 | Pal | H02M 3/33515 363/16 |
| 2015/0207401 A1* | 7/2015 | Zhang | H02M 3/07 323/271 |
| 2015/0244270 A1* | 8/2015 | Karlsson | H02M 1/32 363/17 |
| 2020/0272184 A1* | 8/2020 | Petenyi | G05F 1/565 |
| 2022/0077783 A1* | 3/2022 | Khamesra | H02M 1/0019 |

OTHER PUBLICATIONS

European Search Report Application No. EP21168386; dated Sep. 7, 2021; pp. 7.

* cited by examiner

INTELLIGENT ARCHITECTURE FOR ACTUATOR MOTOR DRIVE POWERED FROM WIDE-INPUT HIGH-VOLTAGE DIRECT CURRENT

BACKGROUND

This application claims the benefit of Indian Application No. 202011016495 filed Apr. 16, 2020, the disclosure of which is incorporated herein by reference in its entirety.

The following description relates to actuator motor drives and, more specifically, to an intelligent architecture In high-voltage direct current (DC) fed motor drive systems, including wide-input variations, creepage and clearance requirements (i.e., printed circuit board (PCB) size and thickness) increase exponentially with respect to input voltages exceeding 500V and thus impose constraints on component selection. These constrains tend to invalidate or make impractical the use of commercial-off-the-shelf (COTS) options for things like power components (i.e., MOSFETs, IGBTs, etc.), DC link capacitors and PCBs with standard thicknesses. This can force designers to formulate customized design solutions. Needs for such customized design solutions increase overall costs, lead times and single-source solutions.

BRIEF DESCRIPTION

According to an aspect of the disclosure, an intelligent architecture system is provided. The intelligent architecture system includes an input line, an output line and an intelligent architecture operably interposed between the input line and the output line. The intelligent architecture is configured to control a voltage of the output line in accordance with a voltage of the input line.

In accordance with additional or alternative embodiments, the intelligent architecture is operable in various modes in accordance with the voltage of the input line.

In accordance with additional or alternative embodiments, the intelligent architecture is operable in an inrush current limiting mode until the voltage of the input line reaches a nominal minimum.

In accordance with additional or alternative embodiments, when the voltage of the input line exceeds a nominal maximum, the intelligent architecture is operable in a DC link voltage limiting mode.

In accordance with additional or alternative embodiments, the intelligent architecture is operable in an input voltage bypass mode when the voltage of the input line exceeds the nominal minimum other than during a ramp-up stage.

In accordance with additional or alternative embodiments, the intelligent architecture includes a main line connected to the input and output lines, a voltage limiter disposed along the main line, a logic selector, a pulse width modulation (PWM) generator to drive an operation of the voltage limiter in accordance with a signal from the logic selector and first and second bypass lines connected with the main line and the logic selector.

In accordance with additional or alternative embodiments, the main line is connected at an upstream end thereof to the input line and at a downstream end thereof to the output line and the first and second bypass lines are connected to the upstream and downstream ends of the main line, respectively.

In accordance with additional or alternative embodiments, the intelligent architecture further includes an input voltage sensing unit and an inrush control unit disposed along the first bypass line.

In accordance with additional or alternative embodiments, the intelligent architecture further includes an output voltage sensing unit and a high voltage control unit disposed along the second bypass line.

According to an aspect of the disclosure, an intelligent architecture system is provided. The intelligent architecture system includes an input line, an output line and an intelligent architecture operably interposed between the input line and the output line. The intelligent architecture is configured to operate in various modes in accordance with the voltage of the input line to thereby control a voltage of the output line in accordance with the voltage of the input line.

In accordance with additional or alternative embodiments, the intelligent architecture is operable in an inrush current limiting mode until the voltage of the input line reaches a nominal minimum.

In accordance with additional or alternative embodiments, when the voltage of the input line exceeds a nominal maximum, the intelligent architecture is operable in a DC link voltage limiting mode.

In accordance with additional or alternative embodiments, the intelligent architecture is operable in an input voltage bypass mode when the voltage of the input line exceeds the nominal minimum other than during a ramp-up stage.

In accordance with additional or alternative embodiments, the intelligent architecture includes a main line connected to the input and output lines, a voltage limiter disposed along the main line, a logic selector, a pulse width modulation (PWM) generator to drive an operation of the voltage limiter in accordance with a signal from the logic selector and first and second bypass lines connected with the main line and the logic selector.

In accordance with additional or alternative embodiments, the main line is connected at an upstream end thereof to the input line and at a downstream end thereof to the output line and the first and second bypass lines are connected to the upstream and downstream ends of the main line, respectively.

In accordance with additional or alternative embodiments, the intelligent architecture further includes an input voltage sensing unit and an inrush control unit disposed along the first bypass line.

In accordance with additional or alternative embodiments, the intelligent architecture further includes an output voltage sensing unit and a high voltage control unit disposed along the second bypass line.

According to an aspect of the disclosure, a method of operating an intelligent architecture interposed between an input line and an output line is provided. The method includes determining a voltage of the input line and whether a ramp-up stage is in effect, controlling a voltage of the output line to be equal to the voltage of the input line in an event the voltage of the input line is less than a nominal minimum and the ramp-up stage is in effect, controlling the voltage of the output line to be equal to the voltage of the input line in an event the voltage of the input line exceeds the nominal minimum and is less than a nominal maximum and controlling the voltage of the output line to be equal to the nominal maximum in an event the voltage of the input line exceeds the nominal maximum.

In accordance with additional or alternative embodiments, the intelligent architecture includes a voltage limiter to control the voltage of the output line.

In accordance with additional or alternative embodiments, the nominal minimum (e.g. 400V DC) and the nominal maximum (e.g. 625V DC).

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

These and other advantages and features will become more apparent from the following description taken in conjunction with the drawings.

DETAILED DESCRIPTION

As will be described below, an intelligent architecture is provided to regulate a voltage to a maximum nominal voltage of 625V DC in order to fully utilize creepage and clearance of standard COTS components and in order to reduce voltage stress on the COTS components during normal and abnormal maximum transient conditions. To achieve this regulated voltage, the intelligent architecture includes an intelligent converter that has different modes of operation at different input voltage conditions.

Figure 1:
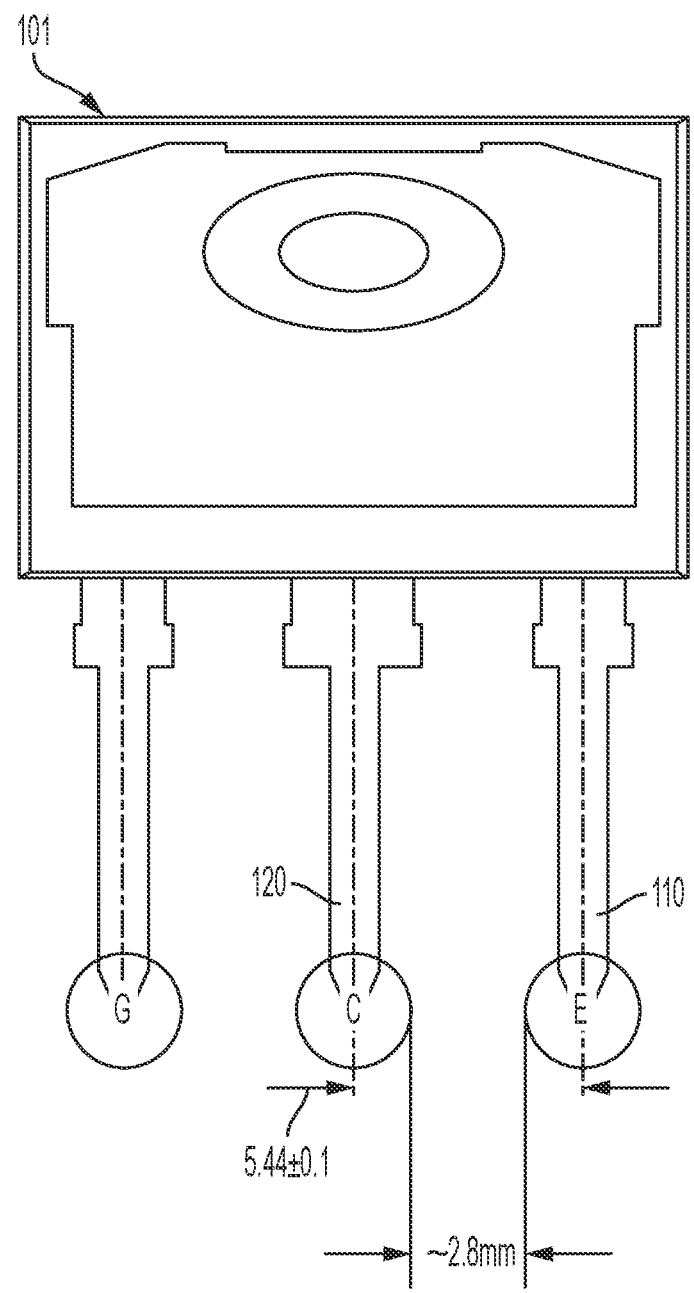
FIG. 1 is a perspective view of a TO-247/TO-264 package in accordance with embodiments.

With reference to FIG. 1, a standard TO-247/TO-264 package 101 is provided and includes a drain/collector 110 and a source/emitter 120. The nominal creepage and clearance between the drain/collector 110 and the source/emitter 120 is about ~5.44 mm and about ~2.8 mm when pin width is considered. The minimum required creepage and clearance requirements for the package 101 at 700V DC bus operation is about ~1.92 mm. While this is well within the package 101 dimensions, the package 101 will not provide adequate creepage and clearance for operations beyond the 700V DC bus operation. Therefore, an intelligent architecture system is provided to avoid or prevent operations beyond certain DC voltage limits.

Figure 2:
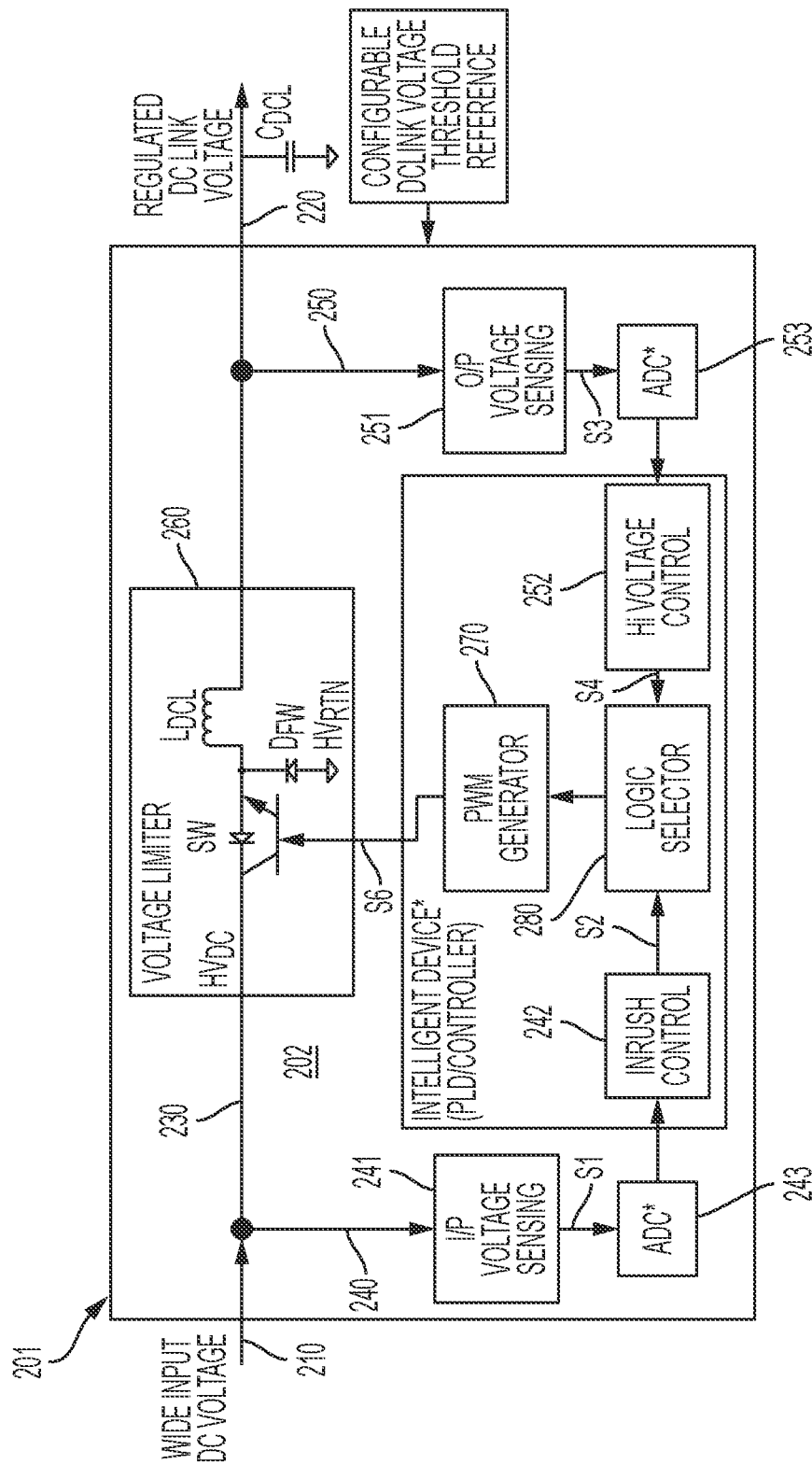
FIG. 2 is a schematic diagram of an architecture of an intelligent controller for driving an actuator motor in accordance with embodiments.

With reference to FIG. 2, the intelligent architecture system 201 is provided and includes an input line 210, which has a characteristic wide-input DC voltage, an output line 220, which connects with a regulated DC link voltage and an intelligent architecture 202 operably interposed between the input line 210 and the output line 220. The intelligent architecture 202 is configured to operate in various modes in accordance with a voltage of the input line 210 to thereby control a voltage of the output line 220 in accordance with the voltage of the input line 210. That is, when the voltage of the input line 210 is ramping up (i.e., during the power up condition where voltage ramps up from 0V, steadily in some but not all cases, or when the power up condition is known to be in effect), the intelligent architecture 202 is operable in an inrush current limiting mode, when the voltage of the input line 210 exceeds a nominal maximum, the intelligent architecture 202 is operable in a DC link voltage limiting mode and when the voltage of the input line 210 exceeds the nominal minimum and is lower than the nominal maximum, the intelligent architecture 202 is operable in an input voltage bypass mode.

The intelligent architecture 202 includes a main line 230, a first bypass line 240 and a second bypass line 250. The main line 230 is connected at an upstream end thereof to the input line 210 and at a downstream end thereof to the output line 220. A voltage limiter 260 is disposed along the main line 230 between the upstream and downstream ends. The voltage limiter 260 receives operational signals from a pulse width modulation (PWM) generator 270, which is partially controlled by a logic selector 280. The logic selector 280 receives inputs from the first and second bypass lines 240 and 250. The first bypass line 240 is connected at an upstream end thereof to the upstream end of the main line 230 and at a downstream end thereof to the logic selector 280. The second bypass line 250 is connected at an upstream end thereof to the downstream end of the main line 230 and at a downstream end thereof to the logic selector 280. The intelligent architecture 202 further includes an input voltage sensing unit 241, an inrush control unit 242 and an analog-to-digital converter (ADC) 243, which are disposed in sequence along the first bypass line 240, as well as an output voltage sensing unit 251, a high voltage control unit 252 and an ADC 253, which are disposed in sequence along the second bypass line 250.

In accordance with embodiments, the voltage limiter 260 includes an $HV_{DC}$ line as an extension of the input line 110, a switch SW that is communicative with the $HV_{DC}$ line and the PWM generator 270, an inductor $L_{DCL}$ electrically interposed between the switch SW and the output line 220, a signal ground $HV_{RTN}$ and a diode $D_{FW}$ interposed between the switch SW and the signal ground $HV_{RTN}$.

In accordance with further embodiments, the intelligent architecture system 201 can further include a configurable DC link voltage threshold reference unit 290, which is communicative with the intelligent architecture 202, and a capacitor CDCL, which is electrically interposed between the output line 220 and the configurable DC link voltage threshold reference unit 290.

During an operation of the intelligent architecture 202, the input voltage sensing unit 241 senses an input voltage at the upstream end of the main line 230 and issues a signal S1 to the inrush control unit 242 via the ADC 243 whereupon the inrush control unit 242, in turn, issues a signal S2 to the logic selector 280 in accordance with the signal S1. The signal S2 can be indicative of a signal or instruction to initiate an inrush current limiting mode of the voltage limiter 260 (i.e., Mode-0 in FIG. 3) in an event that the voltage of the inrush current is determined by the input voltage sensing unit 241 to be steadily increasing from 0 volts to a nominal minimum voltage. Alternatively, the signal S2 can be indicative of a signal or instruction to not initiate the inrush current limiting mode of the voltage limiter 260 in an event that the voltage of the inrush current is determined by the input voltage sensing unit 241 to not be steadily increasing from 0 volts to the nominal minimum voltage.

During the operation of the intelligent architecture 202, the output voltage sensing unit 251 senses a voltage of output voltage at the downstream end of the main line 230 and issues a signal S3 to the high voltage control unit 252 via the ADC 253 whereupon the high voltage control unit 252, in turn, issues a signal S4 to the logic selector 280 in accordance with the signal S3. The signal S4 can be indicative of a signal or instruction to initiate a DC link voltage limiting mode of the voltage limiter 260 (i.e., Mode-1 in FIG. 3) in an event that the voltage of the output voltage is determined by the output voltage sensing unit 251 to be above a nominal maximum voltage. Alternatively, the signal S4 can be indicative of a signal or instruction to not initiate the DC link voltage limiting mode of the voltage limiter 260 in an event that the voltage of the output voltage is determined by the output voltage sensing unit 251 to not be above the nominal maximum voltage.

The logic selector 280 issues a signal S5 to the PWM generator 270 which, in turn, sends a PWM signal S6 to the voltage limiter 260 in accordance with the signal S5. The PWM signal S6 controls the voltage limiter to operate in Mode-0, Mode-1 or Mode-2 (see FIG. 3). That is, when the signal S2 is indicative of the signal or instruction to initiate the inrush current limiting mode of the voltage limiter 260, the logic selector 280 and the PWM generator 270 cooperatively cause the voltage limiter 260 to operate in Mode-0. Conversely, when the signal S4 is indicative of the signal or instruction to initiate the DC link voltage limiting mode of the voltage limiter 260, the logic selector 280 and the PWM generator 270 cooperatively cause the voltage limiter 260 to operate in Mode-1. When the signals S2 and S4 are both indicative of the signal or instruction to not initiate the inrush current limiting mode or the DC link voltage limiting mode of the voltage limiter 260, the logic selector 280 and the PWM generator 270 cooperatively cause the voltage limiter 260 to operate in Mode-2.

In greater detail, when the input voltage is less than a given level (e.g., 620V DC), the intelligent architecture 202 passes the voltage to a DC link along the output line 220 through the voltage limiter 260 with the switch SW turned "ON" permanently. This is the "Input voltage Bypass Mode" or Mode-2. When the input voltage is greater than a given value (e.g., 625V DC), the intelligent architecture 202 regulates the DC link bus voltage along the output line 220 to 625V DC and in this case the voltage limiter 260 operates in a PWM mode where the switch SW, the diode $D_{FW}$, the inductor $L_{DCL}$ and the capacitor CDCL regulate the output voltage. This is the "DC Link Voltage Limiting Mode" or Mode-1. During the power up condition where voltage ramps up from 0V, the intelligent architecture 202 regulates the input current along the input line 210 (i.e., current due to capacitor CDCL on the DC link) to the required starting current profile. Under this condition, the voltage limiter 260 operates in a PWM mode where the switch SW, the diode $D_{FW}$, the inductor $L_{DCL}$ and the capacitor CDCL control the DC link voltage output such that the current flowing into the voltage limiter 260 is regulated. This is the "Inrush Current Limiting Mode" or Mode-0.

Figure 3:
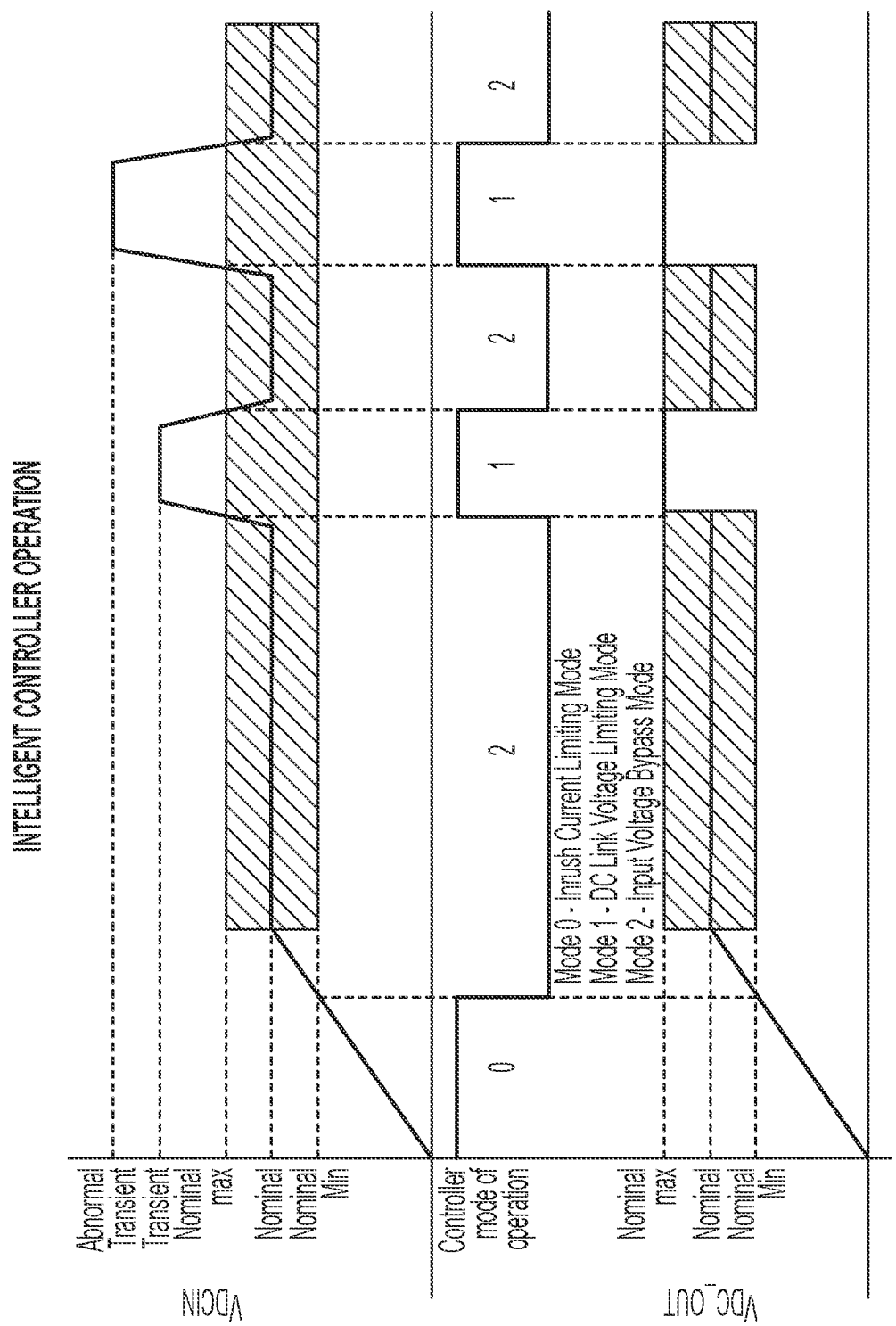
FIG. 3 is a graphical depiction of operational timing for the architecture of FIG. 2 in accordance with embodiments.

The operations of the intelligent architecture 202 of FIG. 2 are illustrated graphically in FIG. 3. As shown in FIG. 3, during a ramping up of input voltage (i.e., during the power up condition where voltage ramps up from 0V, steadily in some but not all cases, or when the power up condition is known to be in effect), the voltage limiter 260 is operated in Mode-0. Mode-0 is terminated when the input voltage exceeds the nominal minimum voltage (e.g., 400V DC). At this point, the voltage limiter 260 is operated in Mode-2 whereupon the output voltage equals the input voltage if the input voltage is less than the nominal voltage (e.g., 540V DC) or the output voltage equals the nominal voltage if the input voltage is at or above nominal. Subsequently, the voltage limiter 260 is operated in Mode-1 if the input voltage exceeds the nominal maximum voltage (e.g., 625V DC) and arrives, for example, at the normal transient condition (e.g., 725V DC in association with transient conditions during normal operations) or the abnormal transient condition (e.g., 900 V DC in association with abnormal transient conditions).

Thus, it is apparent that the intelligent architecture 202 of FIG. 2 drives output voltage conditions down to levels between the nominal maximum voltage and the nominal minimum voltage when input voltages exceed the nominal maximum voltage. As such, the dimensions of the package 101 of FIG. 1, such as the nominal creepage and the clearance thereof, can be maintained at limited levels in compliance with IPC2221 requirements. This allows for the selection of COTS components for the package 101 of FIG. 1.

Figure 4:
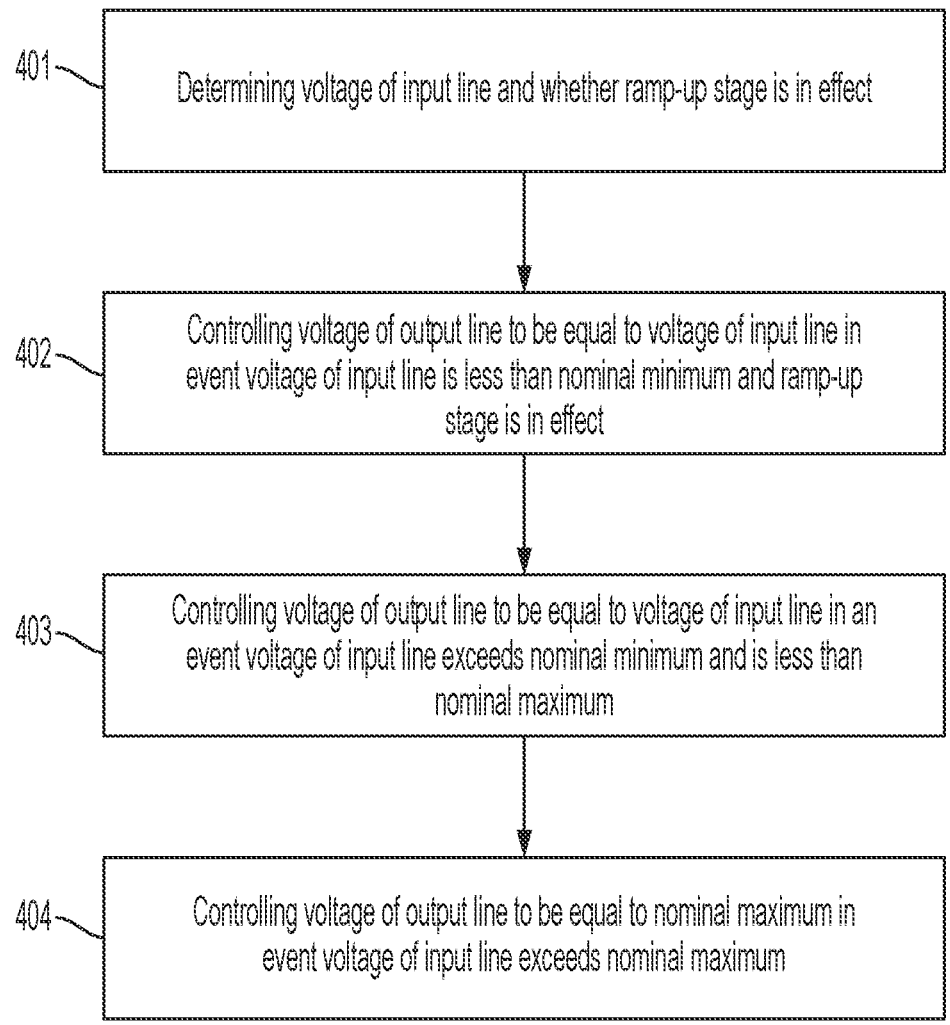
FIG. 4 is a flow diagram illustrating a method of operating an intelligent architecture in accordance with embodiments.

With reference to FIG. 4, a method of operating an intelligent architecture, such as the intelligent architecture 202 of FIG. 2, is provided. As shown in FIG. 4, the method includes determining a voltage of the input line and whether a ramp-up stage is in effect (401), controlling a voltage of the output line to be equal to the voltage of the input line in an event the voltage of the input line is less than a nominal minimum and the ramp-up stage is in effect (402), controlling the voltage of the output line to be equal to the voltage of the input line in an event the voltage of the input line exceeds the nominal minimum and is less than a nominal maximum (403) and controlling the voltage of the output line to be equal to the nominal maximum in an event the voltage of the input line exceeds the nominal maximum (404).

Technical effects and benefits of the intelligent architecture are that it represents a low-cost solution that can be operable at −55° C. with greater reliability due to reduced voltage stresses on the bus. Also, an area and a thickness of the printed PCB is reduced in direct proportion to bus voltage reductions. Also, the intelligent architecture can have a large number of suppliers with little lead time and limited risks of obsolescence. The intelligent architecture reduces voltage stress on motor windings and can be adopted for higher voltage operations (e.g., 1000V DC bus).

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. An intelligent architecture system, comprising:
an input line;
an output line; and
an intelligent architecture operably interposed between the input line and the output line,
the intelligent architecture being configured to control a voltage of the output line in accordance with a voltage of the input line, the intelligent architecture comprising:
a main line connected at an upstream end thereof to the input line and at a downstream end thereof to the output line;

a voltage limiter disposed along the main line to control the voltage of the output line;

a logic selector;

a pulse width modulation, PWM, generator to drive an operation of the voltage limiter in accordance with a signal from the logic selector;

first and second bypass lines connected at respective opposite ends thereof with the upstream and downstream ends of the main line, respectively, and with the logic selector; and an input voltage sensing unit and an inrush control unit disposed along the first bypass line and an output voltage sensing unit and a high voltage control unit disposed along the second bypass line whereby the logic selector receives inputs from the first and second bypass lines on which the signal is based, wherein the intelligent architecture is operable in various modes in accordance with the voltage of the input line, and wherein:

the logic selector receives an S2 signal from the inrush control unit, which is based on an S1 signal from the input voltage sensing unit, the S2 signal being an instruction to initiate or not initiate an inrush current limiting mode of the voltage limiter if the input voltage sensing unit determines that a voltage of the inrush current is or is not steadily increasing from 0 volts to a nominal minimum voltage, the logic selector receives an S4 signal from the high voltage control unit, which is based on an S3 signal from the output voltage sensing unit, the S4 signal being an instruction to initiate or not initiate a DC link voltage limiting mode if the output voltage sensing unit determines that a voltage of the output voltage is or is not above a nominal maximum voltage, and when:

the signal S2 is the instruction to initiate the inrush current limiting mode, the logic selector and the PWM generator cooperatively cause the voltage limiter to operate in an inrush current limiting mode, the signal S4 is the instruction to initiate the DC link voltage limiting mode, the logic selector and the PWM generator cooperatively cause the voltage limiter to operate in a DC link voltage limiting mode, and the signals S2 and S4 are both the instructions to not initiate the inrush current limiting mode or the DC link voltage limiting mode, the logic selector and the PWM generator cooperatively cause the voltage limiter to operate in an input voltage bypass mode.

2. The intelligent architecture system according to claim 1, wherein the intelligent architecture is operable in an inrush current limiting mode until the voltage of the input line reaches a nominal minimum.

3. The intelligent architecture system according to claim 1, wherein, when the voltage of the input line exceeds a nominal maximum, the intelligent architecture is operable in a DC link voltage limiting mode.

4. The intelligent architecture system according to claim 1, wherein the intelligent architecture is operable in an input voltage bypass mode when the voltage of the input line exceeds a nominal minimum other than during a ramp-up stage.

5. An intelligent architecture system, comprising:

an input line;

an output line; and an intelligent architecture operably interposed between the input line and the output line, the intelligent architecture being configured to operate in various modes in accordance with the voltage of the input line to thereby control a voltage of the output line in accordance with the voltage of the input line, the intelligent architecture comprising:

a main line connected at an upstream end thereof to the input line and at a downstream end thereof to the output line;

a voltage limiter disposed along the main line to control the voltage of the output line;

a logic selector;

a pulse width modulation, PWM, generator to drive an operation of the voltage limiter in accordance with a signal from the logic selector;

first and second bypass lines connected at respective opposite ends thereof with the upstream and downstream ends of the main line, respectively, and with the logic selector; and an input voltage sensing unit and an inrush control unit disposed along the first bypass line and an output voltage sensing unit and a high voltage control unit disposed along the second bypass line whereby the logic selector receives inputs from the first and second bypass lines on which the signal is based, wherein the intelligent architecture is operable in an inrush current limiting mode until the voltage of the input line reaches a nominal minimum, and wherein:

the logic selector receives an S2 signal from the inrush control unit, which is based on an S1 signal from the input voltage sensing unit, the S2 signal being an instruction to initiate or not initiate an inrush current limiting mode of the voltage limiter if the input voltage sensing unit determines that a voltage of the inrush current is or is not steadily increasing from 0 volts to a nominal minimum voltage, the logic selector receives an S4 signal from the high voltage control unit, which is based on an S3 signal from the output voltage sensing unit, the S4 signal being an instruction to initiate or not initiate a DC link voltage limiting mode if the output voltage sensing unit determines that a voltage of the output voltage is or is not above a nominal maximum voltage, and when:

the signal S2 is the instruction to initiate the inrush current limiting mode, the logic selector and the PWM generator cooperatively cause the voltage limiter to operate in an inrush current limiting mode, the signal S4 is the instruction to initiate the DC link voltage limiting mode, the logic selector and the PWM generator cooperatively cause the voltage limiter to operate in a DC link voltage limiting mode, and the signals S2 and S4 are both the instructions to not initiate the inrush current limiting mode or the DC link voltage limiting mode, the logic selector and the PWM generator cooperatively cause the voltage limiter to operate in an input voltage bypass mode.

6. The intelligent architecture system according to claim 5, wherein, when the voltage of the input line exceeds a nominal maximum, the intelligent architecture is operable in a DC link voltage limiting mode.

7. The intelligent architecture system according to claim 5, wherein the intelligent architecture is operable in an input voltage bypass mode when the voltage of the input line exceeds a nominal minimum other than during a ramp-up stage.

\* \* \* \* \*